(12) United States Patent
Nikitin et al.

(10) Patent No.: US 8,339,266 B2
(45) Date of Patent: Dec. 25, 2012

(54) SYSTEM AND METHOD FOR DETERMINING RFID TAG PLACEMENT

(75) Inventors: Pavel Nikitin, Seattle, WA (US); Venkata Kodukula, Bothell, WA (US); John Bleichner, Lake Stevens, WA (US); For S. Lam, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 1253 days.

(21) Appl. No.: 12/046,377

(22) Filed: Mar. 11, 2008

(65) Prior Publication Data
US 2009/0231142 A1 Sep. 17, 2009

(51) Int. Cl.
G08B 13/14 (2006.01)
H04Q 5/22 (2006.01)
G05B 19/00 (2006.01)
G01C 17/38 (2006.01)

(52) U.S. Cl. .............. 340/572.8; 340/572.1; 340/10.1; 340/10.4; 340/5.92; 702/94

(58) Field of Classification Search .............. 340/572.8
See application file for complete search history.

(56) References Cited

U.S. PATENT DOCUMENTS

| 7,132,948 | B2 |  | 11/2006 | Sweeney, II | |
| 7,161,489 | B2 | * | 1/2007 | Sullivan et al. | 340/572.4 |
| 7,227,470 | B2 | * | 6/2007 | Nedblake | 340/572.1 |
| 7,595,729 | B2 | * | 9/2009 | Ku et al. | 340/572.1 |

OTHER PUBLICATIONS

"Easy Tag Product Overview—Technical Information," http://odintechnologies.com/u_documents/doc_20_1.pdf, accessed on Dec. 17, 2008, 6 pages.
"Easy Tag" http://www/odintechnologies.com/index.php/software/easytag, accessed on Dec. 2, 2008, 2 pages.
"EpcHOTSPOT let's you see what your RFID reader sees in real time," http://epchotspot.com/, accessed on Dec. 2, 2008, 1 page.
EpcHOTSPOT brochure "RFID Power Tools and Features," www.epcHOTSPOT.com. Accessed on Dec. 2, 2008, 2 pages.
EpcHOTSPOT, "EPC Hotspot is the application suite for visualizing and optimizing Gen2 RFID performance," http://www.qtrac.com/pdf/Instant%20EPC%20Hotspot%20Brochure.pdf, May 2007, 10 pages.
"RFID Tag Locator Brochure," http://www.capesystems.com/brochures/brochure-RFID-F-lowres.pdf, accessed on Dec. 17, 2008, 4 pages.
"RFID Tag Locator" http://www.capesystems.com/cape_systems_rfid_tag_locator.htm, accessed on Dec. 2, 2008, 2 pages.
Mallinson, H., Hodges, S.; Thorne, "A System to test the performance of RFID-tagged objects," International Symposium on Applications and the Internet, 2007, 4 pages.
Rao et al., "Antenna Design for UHF RFID Tags: A Review and a Practical Application," IEEE Transactions on Antennas and Propagation, vol. 53, No. 12, Dec. 2005, 9 pages.

* cited by examiner

Primary Examiner — Jennifer Mehmood
Assistant Examiner — John Mortell
(74) Attorney, Agent, or Firm — Perkins Coie LLP

(57) ABSTRACT

In systems and methods for determining the placement of radio-frequency identification (RFID) tags, a tag reader communicates with one or more RFID tags at different locations of a target object. The tag reader determines which of the different locations is a preferable location for placing an RFID tag by detecting the transmission power level or other value required to communicate with the RFID tag at each of the different locations.

25 Claims, 10 Drawing Sheets

| Tag | 1 | 2 | .. | L |
|---|---|---|---|---|
| 1 | P11 | P12 | .. | P1L |
| 2 | P21 | P22 | .. | P2L |
| .. | .. | .. | .. | .. |
| M | .. | .. | .. | PML |

SYSTEM AND METHOD FOR DETERMINING RFID TAG PLACEMENT

BACKGROUND

Many businesses use radio-frequency identification (RFID) tags to automatically identify and track objects such as packages, crates, pallets, and various products or other forms of inventory. These tags are generally placed on the objects using an automatic tag applicator, and then the objects are identified and tracked by one or more tag readers each including an antenna and an accompanying logic apparatus.

When an object having an RFID tag is placed near a tag reader, the RFID tag receives electromagnetic signals from the reader. In response to these electromagnetic signals, the RFID tag generates radio waves with a unique pattern identifying the RFID tag. The reader's antenna receives these radio waves and transmits them to the logic apparatus, which interprets the radio waves to determine the identity of the object. Examples of the general structure and operation of RFID tags are presented in a paper entitled "Antenna Design for UHF RFID Tags: A Review and a Practical Application", IEEE Transactions on Antennas and Propagation, Vol. 53, No. 12, December 2005.

Ideally, a tag reader is able to quickly and reliably identify objects based on their RFID tags. For instance, where a tag reader tracks and identifies objects passing along a conveyor belt, the tag reader should be able to reliably identify the objects at a rate commensurate with the speed of the conveyor belt. If the tag reader station is too slow or unreliable, it may lose track of objects passing along the conveyor belt, or it may require the conveyor belt to pause or slow down, reducing the conveyor belt's efficiency.

One significant cause of failures in conventional tag readers is electromagnetic interference from objects being tracked. As an example, suppose an RFID tag is used to track a box containing electronic equipment such as a television. If the RFID tag is placed too close to electromagnetic components of the television, the television may interfere with the tag's reception of signals from a tag reader, or with the tag's transmission of radio waves to the tag reader. Because of this electromagnetic interference, the tag reader may fail to identify the RFID tag.

To illustrate this type of electromagnetic interference, FIG. 1 shows a box 105 including a large object 110 generating electromagnetic interference. For explanation purposes, we will assume that object 110 comprises a large metal cylinder. Two RFID tags are placed on box 105: one at a location "A", and another at a location "B". Because the tag at location "B" is closer to object 110 compared with the tag at location "A", the tag at location "B" will experience relatively greater electromagnetic interference when communicating with a reader antenna 115. Accordingly, in the relatively simple example of FIG. 1, a tag reader can more reliably identify box 105 when the RFID tag is placed at location "A".

In the relatively simple example of FIG. 1, an observer can intuitively recognize the advantage of placing an RFID tag at location "A" rather than at location "B" based on the shape and location of object 110. However, in boxes containing more complex objects, or objects arranged in more complex patterns, it becomes difficult for an observer to determine good locations for an RFID tag. For instance, in electronic equipment including complex parts made of metal, ceramics, and plastics, it may be difficult to determine which part of the equipment generates the most electromagnetic interference for an RFID tag. Moreover, to efficiently determine a relatively good location on for an RFID tag on a box, it may be desirable to avoid the need for an observer to inspect the box's contents.

To more efficiently determine appropriate locations for RFID tags, researchers have developed a number of techniques for automatically measuring patterns of electromagnetic interference in potential tag locations. These patterns are then relied on to place tags in locations with relatively low interference.

In some of these techniques, a machine holds an RFID tag and moves the tag to different locations on a box. At each location, the machine measures signal characteristics at both the RFID tag and a tag reader to determine whether or not the location allows reliable communication between the RFID tag and the tag reader. An example of one such technique is disclosed in U.S. Pat. No. 7,132,948 to Sweeney (Sweeney).

Similarly, in other conventional techniques, a machine moves a box to different locations relative to an RFID tag. As the box is moved to these different locations, the machine tests the reader's ability to communicate with the RFID tag. Based on these tests, the machine determines preferable locations for placing RFID tags. An example of one such technique is disclosed in a paper entitled "A System to Test the Performance of RFID-Tagged Objects", by Hugo Mallinson et al, Proceedings of the 2007 International Symposium on Applications and the Internet Workshops (Mallinson).

Unfortunately, these conventional automated techniques have several shortcomings. One notable shortcoming is that these techniques tend to be slow. For instance, it may take a long time to move around a single tag or box as in Sweeney or Mallinson. As a result, these techniques take a long time to determine good locations for placing an RFID tag on a box.

Another shortcoming is that these techniques are not readily implemented in real environments where RFID tag reading generally occurs. For instance, machines for moving a box or tag around to different locations are not readily implemented along a conveyor belt system. Because these techniques are not readily implemented in real environments, they may fail to account for additional sources of electromagnetic interference in the real environments.

In view of these shortcomings, a need exists for improved systems for determining RFID tag placement. The conventional systems and related shortcomings are presented in this section for illustration purposes. However, the described shortcomings are not the only limitations of conventional systems. Other limitations of existing or prior systems will become apparent to those of skill in the art upon reading the following written description.

DETAILED DESCRIPTION

Various examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Examples of the invention include various methods and apparatuses for determining where to place RFID tags on objects having variable electromagnetic characteristics—i.e., electromagnetic characteristics that vary based on locations about the object. For instance, examples of the invention may be used to determine where to place an RFID tag on a box containing electronic equipment, a foil lining, or other possibly charged objects.

Examples of the invention find ready application in settings where RFID tags are placed on objects such as inventory, products, or packages. These settings may include, for example, industrial warehouses or shipping sites where objects are tagged while moving along a conveyor belt. These settings may additionally include commercial locations such as airports, supermarkets, and retail stores. Objects that have been tagged using selected examples of the invention may be subsequently identified, tracked, and routed by detecting the RFID tags and performing various actions based on the detections.

Various examples of the invention may be used in conjunction with other package processing technologies, such as automatic tag or label applicators, and robotic machines for moving and manipulating packages. Additionally, RFID tags and readers may be used in conjunction with other package tracking and/or inspection technologies such as computer vision systems, x-ray package scanners, and so forth.

Figure 1:
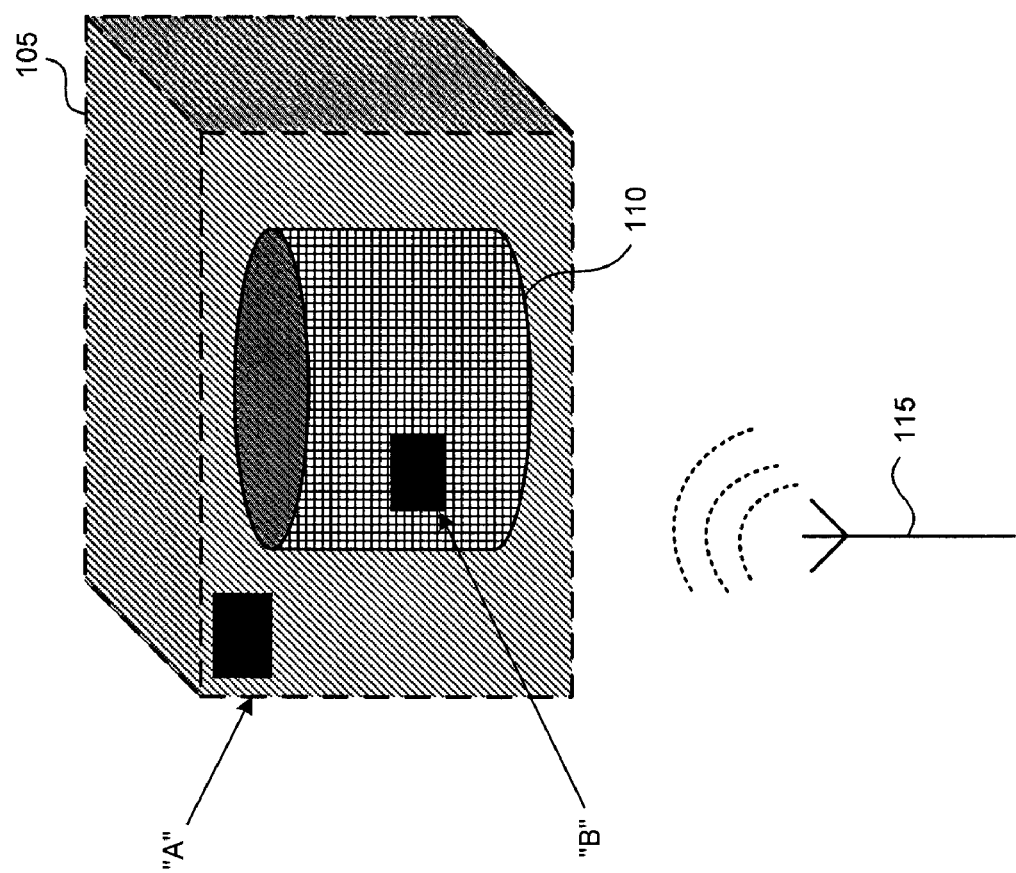
FIG. 1 illustrates an RFID tag in two different locations on a box containing an object capable of interfering with RF transmissions.
Figure 2:
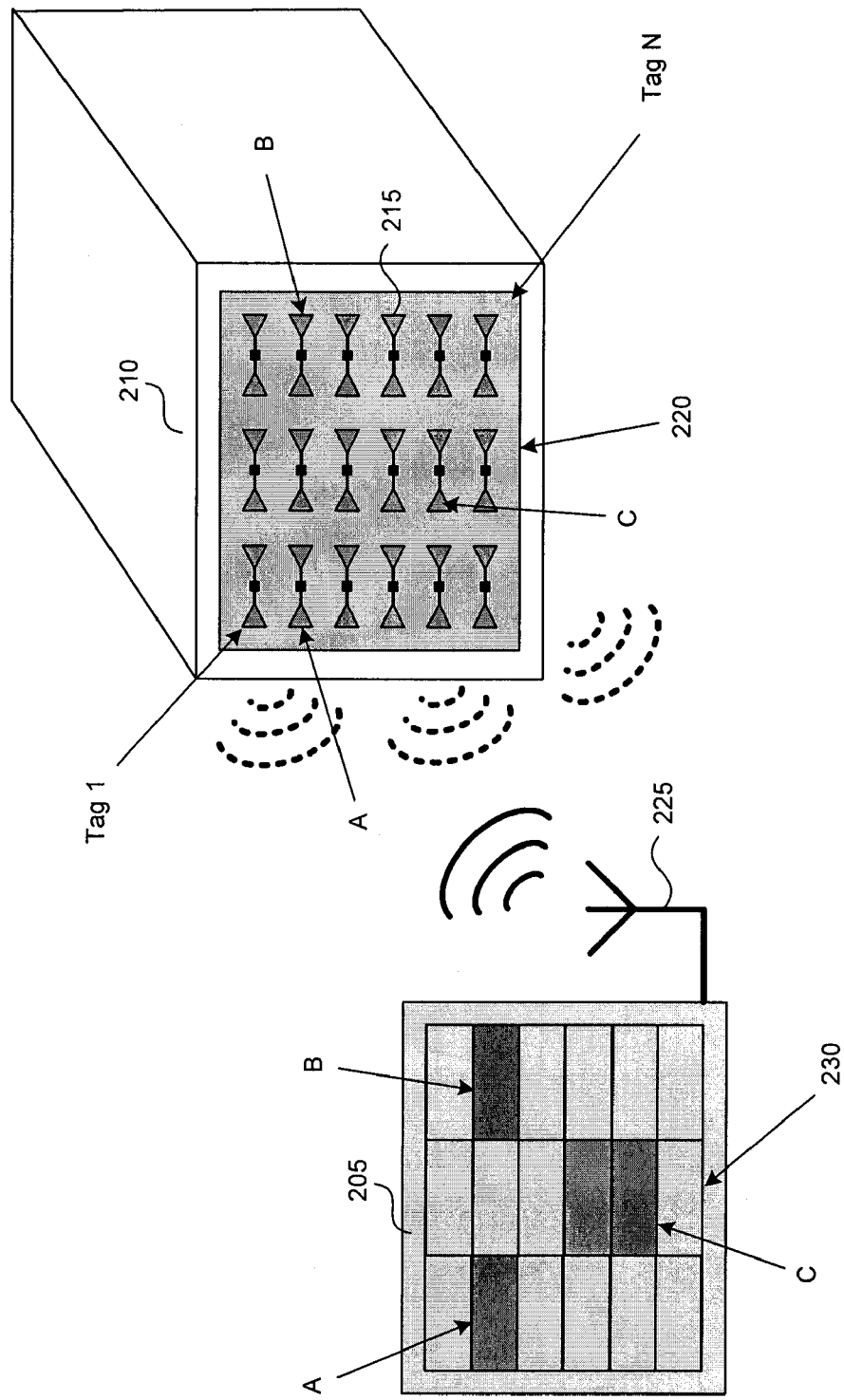
FIG. 2 illustrates an example system for determining RFID tag placement.

FIG. 2 illustrates one example system 200 for determining RFID tag placement. In general, system 200 tests tags attached to several different locations on a test box to determine which tag is most sensitive to communications from a tag reader. The location of the tag that is most sensitive to communications from the tag reader is determined as a preferred location for placing RFID tags on other boxes having the same contents as the test box. For instance, if system 200 determines that the most sensitive RFID tag on a test box including a television is located at the upper left corner of the test box, then system 200 may determine that other boxes including the same type of television should each have an RFID tag placed at its upper left corner.

Referring to FIG. 2, system 200 comprises a box such as a test box 210 including content capable of generating electromagnetic interference for an RFID tag. A test sheet 220 having multiple RFID tags 215 (tags 1 through "N") is attached to or temporarily positioned next to the front of test box 210. Because each of RFID tags 215 is attached to a different part of the front of test box 210, each RFID tag 215 will experience a different amount of electromagnetic interference from the contents of test box 210. In the example of FIG. 2, each of RFID tags comprises a dipole antenna having triangular ends. However, these dipole antennae could be replaced by other types of RFID antennae.

System 200 further comprises an RFID tag reader 205 comprising an antenna 225, signal processing technology and logical components such as a computer processor (internal to tag reader 205), and a display 230. Among the logical components within RFID tag reader 205 is a power reader for storing, detecting, and/or outputting a transmission power level used by antenna 225 to send interrogation signals. More generally, a power reader may comprise any component within or associated with an RFID tag reader, which is capable of identifying the transmission power level of a reader antenna in an RFID tag reader.

Antenna 225 transmits and receives RF signals for communication with RFID tags 215. In order for tag reader 205 to effectively communicate with RFID tags 215, antenna 225 should be separated from test sheet 220 by a distance at least as large as one wavelength of the RF signals transmitted by antenna 225. The signal processing technology generates RF signals to be transmitted to RFID tags 215, and interprets RF signals received from RFID tags 215. The logical components control the overall operation of RFID tag reader 205.

Display 230 includes indicators for displaying the relative sensitivity of different RFID tags 215 to communications from antenna 225. As examples, FIG. 2 shows indicators labeled "A", "B", and "C", with relatively dark shading to illustrate that the corresponding tags "A", "B", and "C" in sheet 220 are more sensitive than other RDIF tags 215 on sheet 220. In some examples, display 230 comprises a liquid crystal display (LCD) screen. However, the form of display 230 can vary.

In general, the term "sensitivity", as it applies to an RFID tag, indicates the tag's ability to sense and respond to interrogation signals from a particular RFID reader. As an example, if an RFID tag is unable to sense or respond to interrogation signals transmitted by a particular RFID tag reader at a particular power level or setting, the RFID tag is considered less sensitive than an RFID tag that is capable of responding to those interrogation signals. An RFID tag's sensitivity to transmissions from an RFID tag reader may vary in accordance with many different factors, including, e.g., its distance from an RFID tag reader, the amount of electromagnetic interference present, and intrinsic properties of the RFID tag.

As an alternative to attaching a test sheet to a test box, an array or grid of RFID tags could be placed on a low dielectric permittivity frame at the end of a rod or robotic arm. The rod or arm could be connected to a tag reader or attached to a fixed location apart from a tag reader, such as at the side of a conveyor belt. The array or grid could be placed next to a box (or the box could be placed next to the array or grid) to determine the placement of an RFID tag on the box. This alternative technique has the advantage that it can efficiently determine RFID tag placement on a series of boxes on a conveyor with unknown or varying contents.

Current RFID tag readers are capable of reading tags at efficient rates as high as one thousand tags per second. As a result, a grid of tags on a test sheet such as that shown in FIG. 2 can be tested relatively quickly, e.g., in less than 0.1 seconds. As a result, a system such as that illustrated in FIG. 2 can determine RFID tag placement for boxes moving along a conveyor belt or for stationary boxes.

Figure 3A:
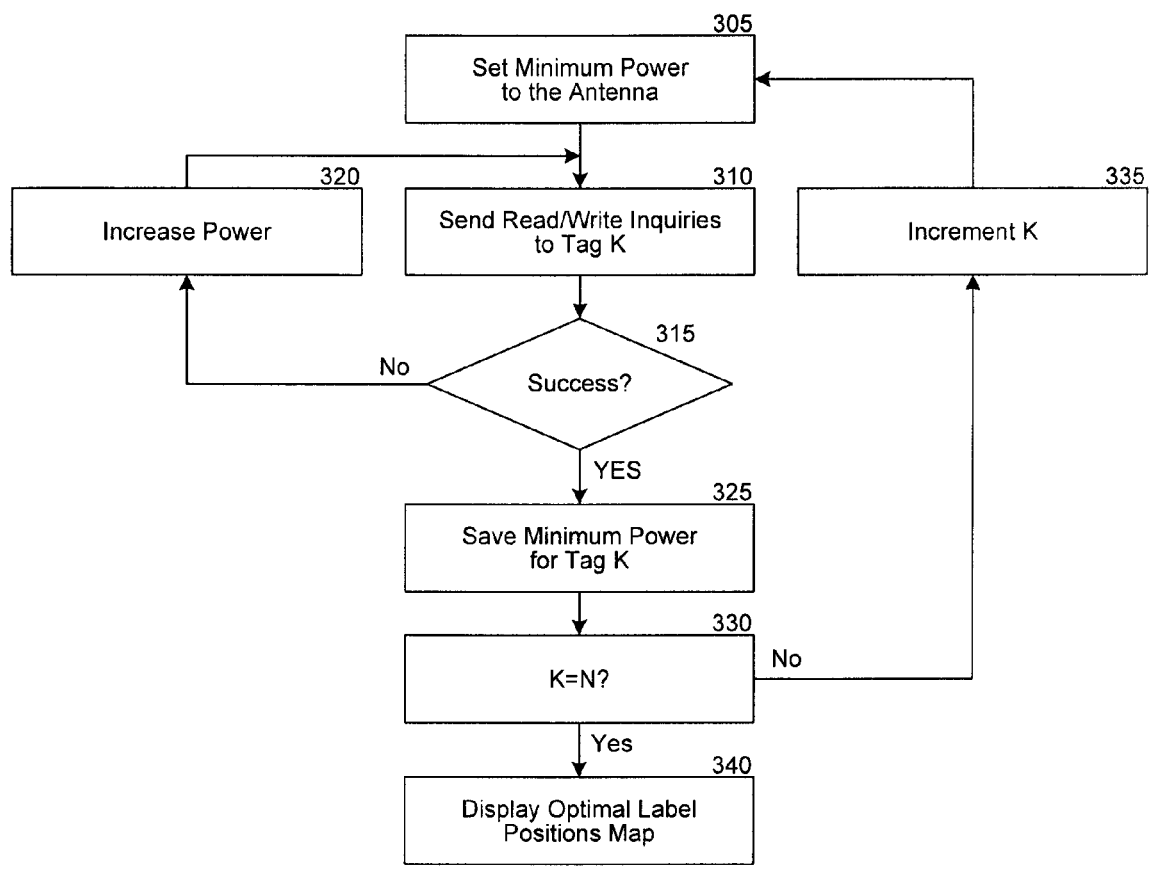
FIG. 3A illustrates an example method for determining RFID tag placement in a system such as that illustrated in FIG. 2.
Figure 3B:
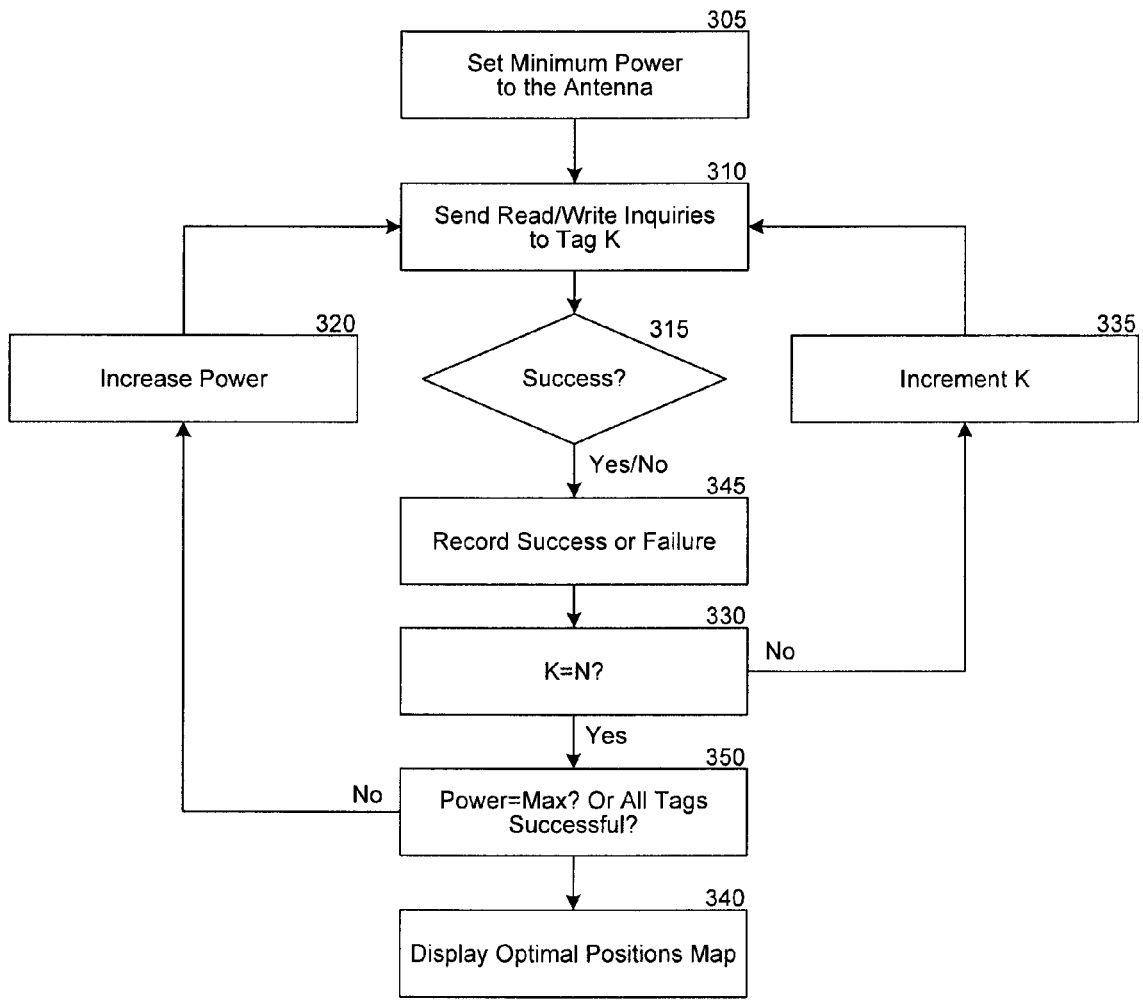
FIG. 3B illustrates another example method for determining RFID tag placement in a system such as that illustrated in FIG. 2.

FIGS. 3A and 3B are flowcharts illustrating methods for determining the sensitivity of RFID tags to communications from an antenna. For explanation purposes, it will be assumed that these methods are performed by the system of FIG. 2. In particular, it will be assumed that the methods are performed through a series of communications between tag reader 205 and RFID tags 215. It should be understood, however, that the methods of FIGS. 3A and 3B could be performed by a variety of alternative systems each including at least an antenna and multiple RFID tags. In the description that follows, example method steps are indicated by parentheses (XXX) to distinguish them from example system components or features.

Referring to FIG. 3A, RFID tag reader 205 sets the power level of antenna 225 to a predetermined minimum value (305). In other words, RFID tag reader 205 controls antenna 225 to transmit signals with a minimum power level. Additionally, although not shown, RFID tag reader 205 initializes a variable "K=1" so that RFID tag reader 205 will first communicate with tag "1" among RFID tags 215 (where in this example, the tags are sequentially numbered, starting with 1).

Next, RFID tag reader 205 transmits interrogation signals to tag "K" through antenna 225 (310). These interrogation signals typically comprise read and/or write inquiries for inspecting or modifying data stored in tag "K". RFID tag reader 205 initially transmits the interrogation signals using the minimum power level in order to determine whether tag "K" is capable of detecting and responding to signals transmitted at the minimum power level.

RFID tag reader 205 can use any of several techniques to identify a selected RFID tag (i.e., tag "K") of test sheet 220 or to relate the location of a particular tag with a tag identifier (ID). In some examples, RFID tag reader 205 stores a table including RFID tag identifiers and their corresponding locations on test sheet 220. The table can be populated based on responses to a query from RFID tag reader 205, or the table can be populated by manual inputs from a user of system 200 (e.g., after inspecting printed identifiers on the RFID tags in test sheet 220). In some examples, the selected RFID tag stores X-Y coordinates indicating its position on test sheet 220, or it stores have an identifier indicative of its location on test sheet 220. Upon receiving interrogation signals from RFID tag reader 205, the selected RFID tag transmits its X-Y coordinates or the identifier indicating its position. RFID tag reader 205 then determines the location of the selected RFID tag based on the transmitted data. Alternatively, a user or the system creates an initial stored table having each RFID tag ID and its associated position in the two dimensional array or grid.

After RFID tag reader 205 transmits the interrogation signals to tag "K", it determines whether successful communication has occurred with tag "K" (315). In some examples, successful communication occurs if RFID tag reader 205 detects a response from tag "K" based on a single read inquiry. Alternatively, success can be determined when RFID tag "K" responds to multiple read inquiries or write commands among a predetermined number of attempts and/or within a limited range of power levels or frequencies. These alternatives recognize that a single response from an RFID tag does not always indicate that an RFID tag reader can reliably communicate with the RFID tag at a particular power level.

Upon determining that successful communication has occurred between RFID tag reader 205 and tag "K" (315="YES"), RFID tag reader 205 stores the minimum power level for which the successful communication was determined (325). Where success is determined using more than one attempt, power level, or frequency, the minimum power level for the successful communication can be determined together by combining information from the multiple measurements, e.g., by averaging minimum power levels for different frequencies or different attempts. On the other hand, upon determining that successful communication has not occurred between RFID tag reader 205 and tag "K" (315="NO"), RFID tag reader 205 increases its power level (320) and repeats steps 310 and 315.

After successful communication has occurred between RFID tag reader 205 and tag "K", and RFID tag reader 205 has stored the minimum power level for tag "K", the method determines whether "K" is equal to "N" (330). In other words, at step 330, the method tests whether it has evaluated the sensitivity of all of tags 1 through "N". If not (330="NO"), the method increments "K" (335) and repeats steps 305 through 330 using the incremented value of "K". Otherwise (330="YES"), the method presents an indication of the relative or absolute sensitivities of tags 1 through "N" on display 230 (340).

The method of FIG. 3B is similar to the method of FIG. 3A. However, in the method of FIG. 3B, RFID tag reader 205 tests or interrogates each of tags 1 through "N" at the same power level before raising its power level.

As illustrated by FIG. 3B, the power level of antenna 225 is set to a minimum level (305) and "K" is initialized to "1". Next, interrogation signals are sent to tag "K" (310) and the method determines whether successful communication has occurred with tag "K" (315). Upon determining whether successful communication has occurred, the method makes a record of the determination (345), e.g., by storing information in a table of minimum power values. Then, the method determines whether all tags have been interrogated at the current power level (i.e., K=N?) (330). If so (330=YES), the method increments "K" (335) and returns to step 310. Otherwise (330=NO), the method determines whether the current power level is a maximum power level or whether all tags have successfully communicated with RFID tag reader 205 (350).

If power has reached a maximum level or all tags have successfully communicated with RFID tag reader 205 (350=YES), the method displays a map of optimal or preferred tag locations (340). Otherwise, (350=NO), the method increases the power level of antenna 225 (320) and returns to step 310.

While in the example of FIG. 3B the reader cycles through each tag and determines a response, the reader could poll two or more tags nearly concurrently or rapidly and successively, and then determine a response before incrementing the power.

As alternatives to beginning the methods of FIGS. 3A and 3B at a minimum power level and successively increasing the power level, the power level could be initially set to a maximum power level or an intermediate power level. The power level could then be varied from the maximum power level or the intermediate power level to test the sensitivity of tags 1 through "N".

As shown in FIG. 2, display 230 presents relative sensitivities of RFID tags 215 using lights or colors whose intensities vary according to the sensitivity of corresponding RFID tags, as in a "heat-map type" display. This type of display allows an observer to quickly detect the most sensitive among several RFID tags. As alternatives to displaying relative sensitivities with variable-intensity lights, the relative intensities could be displayed using a numerical or symbolic coding scheme. Also, numerical sensitivity values can be stored and displayed.

In practice, the sensitivity of each RFID tag in test sheet 220 may be affected by factors other that its location on test box 210. For instance, the sensitivity of an RFID tag may be affected by manufacturing process tolerances, or by electromagnetic interference from other RFID tags in test sheet 220. Because the sensitivity of each RFID tag in test sheet 220 may be affected by factors other that its location on test box 210, a calibration procedure may be performed on test sheet 200 to determine to what extent differences in tag sensitivity are caused by these other factors. One way to perform this calibration procedure is to measure the sensitivity of the RFID tags in free space—i.e., when unattached to an object such as test box 220. Upon performing the calibration procedure, the RFID tag reader may store an indication of sensitivity variations and adjust measured tag sensitivities based on the stored indications.

Figure 4:
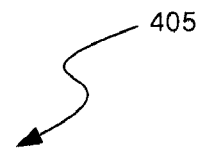
FIG. 4 illustrates minimum power values associated with different RFID tags in a system such as that illustrated in FIG. 2.

FIG. 4 illustrates an alternative way of displaying or storing the sensitivities of RFID tags in a sheet such as test sheet 220 in FIG. 2. In FIG. 4, RFID tag sensitivities are displayed in a table 405 as numerical values P11 through PML. These numerical values correspond to RFID tags arranged in a test sheet having "M" rows and "L" columns. For instance, the value PML corresponds to an RFID tag in row M and column L of the test sheet. In addition to being displayed, the values in table 405 can also be stored for future reference.

Each of the numerical values P11 through PML represents a minimum power level of a tag reader antenna for which the antenna is able to successfully communicate with a corresponding RFID tag. As such, lower values in table 405 correspond to more sensitive RFID tags. Accordingly, a lowest value in table 405 represents a preferred location for placing an RFID tag on a box having the corresponding test sheet with "M" rows and "L" columns.

Figure 5:
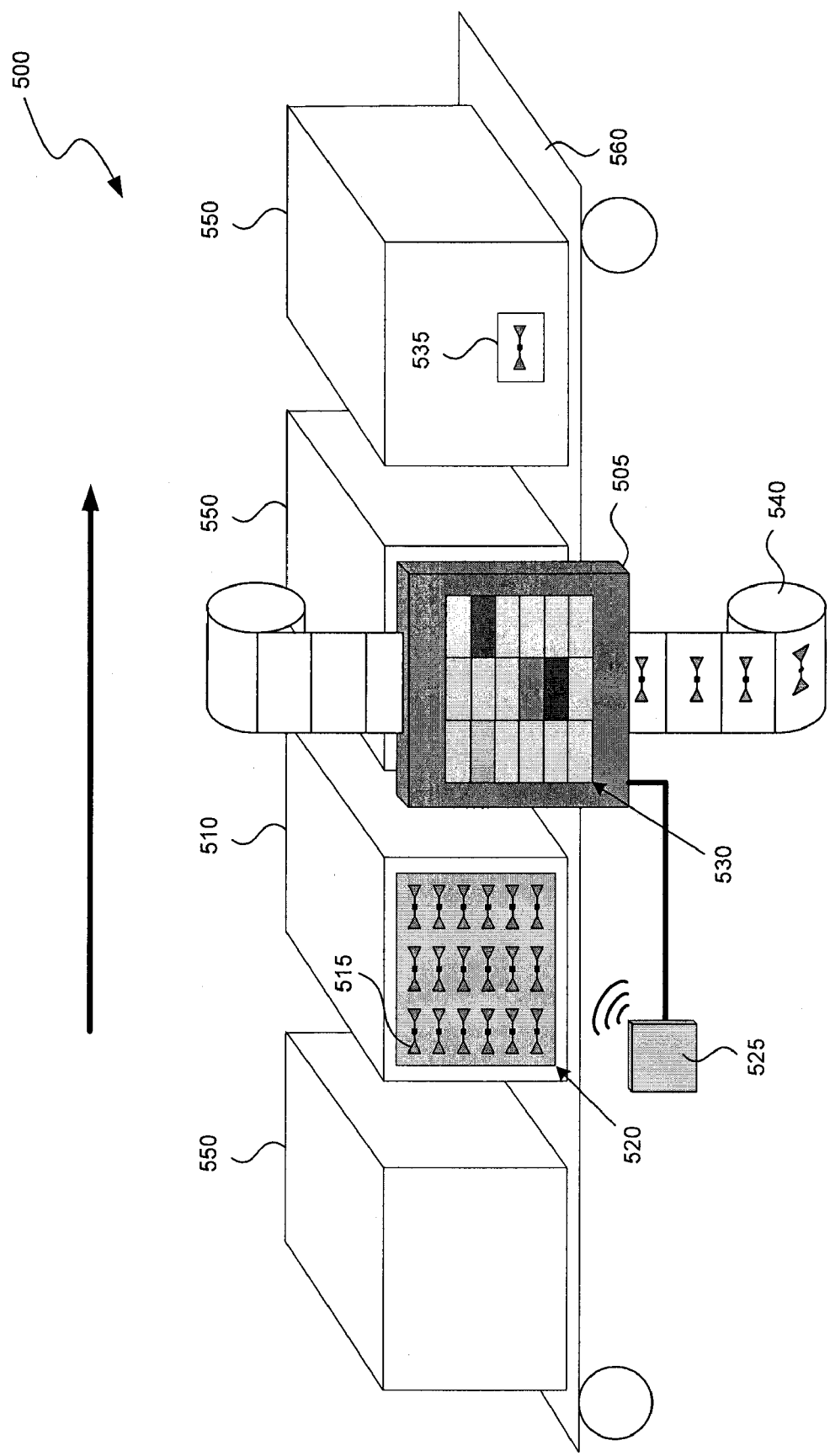
FIG. 5 illustrates another example system for determining RFID tag placement.

FIG. 5 illustrates an example system 500 for determining RFID tag placement. The system of FIG. 5 is similar to the system of FIG. 2, except that the system of FIG. 5 operates in conjunction with a conveyor belt and an automatic RFID tag applicator. System 500 quickly and automatically determines locations for placing RFID tags on boxes carried by the conveyor belt, and then automatically places the tags on the boxes.

Referring to FIG. 5, system 500 comprises a test box 510 including a test sheet 520 having multiple RFID tags 515. Test box 510 is located on a conveyor belt 560 with several other boxes 550. Next to conveyor belt 560 are an automatic tag applicator 540 and a tag reader 505 having a tag reader antenna 525 and a display 530.

As indicated by an arrow at the top of FIG. 5, conveyor belt 560 moves to the right. Accordingly, a right-most box among boxes 550 has already passed by tag reader 505 and received an RFID tag 535 from tag applicator 540. Tag applicator 540 has placed RFID tag 535 on the right-most box based on tag sensitivity measurements shown on display 530. In FIG. 5, the tag sensitivity measurements shown on display 530 were performed on a test sheet that has previously passed by tag reader 505. In some examples, tag reader 505 performs the tag sensitivity measurements using a technique such as that illustrated in FIG. 3A. In other examples, tag reader 505 may use other, different techniques such as that of FIG. 3B.

In the configuration shown in FIG. 5, tag applicator 540 places a tag on one of boxes 550 while tag reader 505 performs tag sensitivity measurements on RFID tags 515. These measurements and tag placement can either be performed while the conveyor belt is in a temporary stalled state, or while the conveyor belt is moving.

After tag reader 505 performs sensitivity measurements on RFID tags 515, display 530 displays these measurements and automatic tag applicator 540 subsequently applies tags to boxes 550 based on the measurements. As an example, tag applicator 540 will place an RFID tag on the left-most box 550 at a location determined by the sensitivity measurements performed on RFID tags 515 on test box 510.

Display 530 serves primarily to indicate tag sensitivity measurements to human observers. Accordingly, display 530 could be omitted from system 500 in examples where sensitivity measurements and tag application are performed without human supervision. Additionally, as an alternative to providing display 530 as shown in FIG. 5, tag reader 505 could instead transmit signals to a remote device such as a personal computer for storage, for display to a human operator, or for monitoring by a computer program.

Although tag reader 505 works in conjunction with automatic tag applicator 540, other techniques could be used for indicating preferred tag locations or for placing the tags on boxes. As one simple alternative for indicating preferred tag locations, a marking agent such as a human operator could mark a preferred location with a marking such as a red dot based on indications shown on display 530. After a box has been marked, a tag applicator downstream from tag reader 505 could place an RFID tag at the location of the marking. As another simple alternative, an automated device could generate a printout indicating a location for placing an RFID on a box. For instance, a printout could indicate a location (e.g., [x=2, y=4]). The printout could then be affixed to the box as a label.

Although the examples in this disclosure show objects marked with a single tag, objects can be marked in more than one spot or with more than one tag. For instance, example systems could place tags or markings in multiple "hot spots" around a box to increase reading reliability or to allow different tag reading to occur in different ways, by different frequencies, etc.

Figure 6:
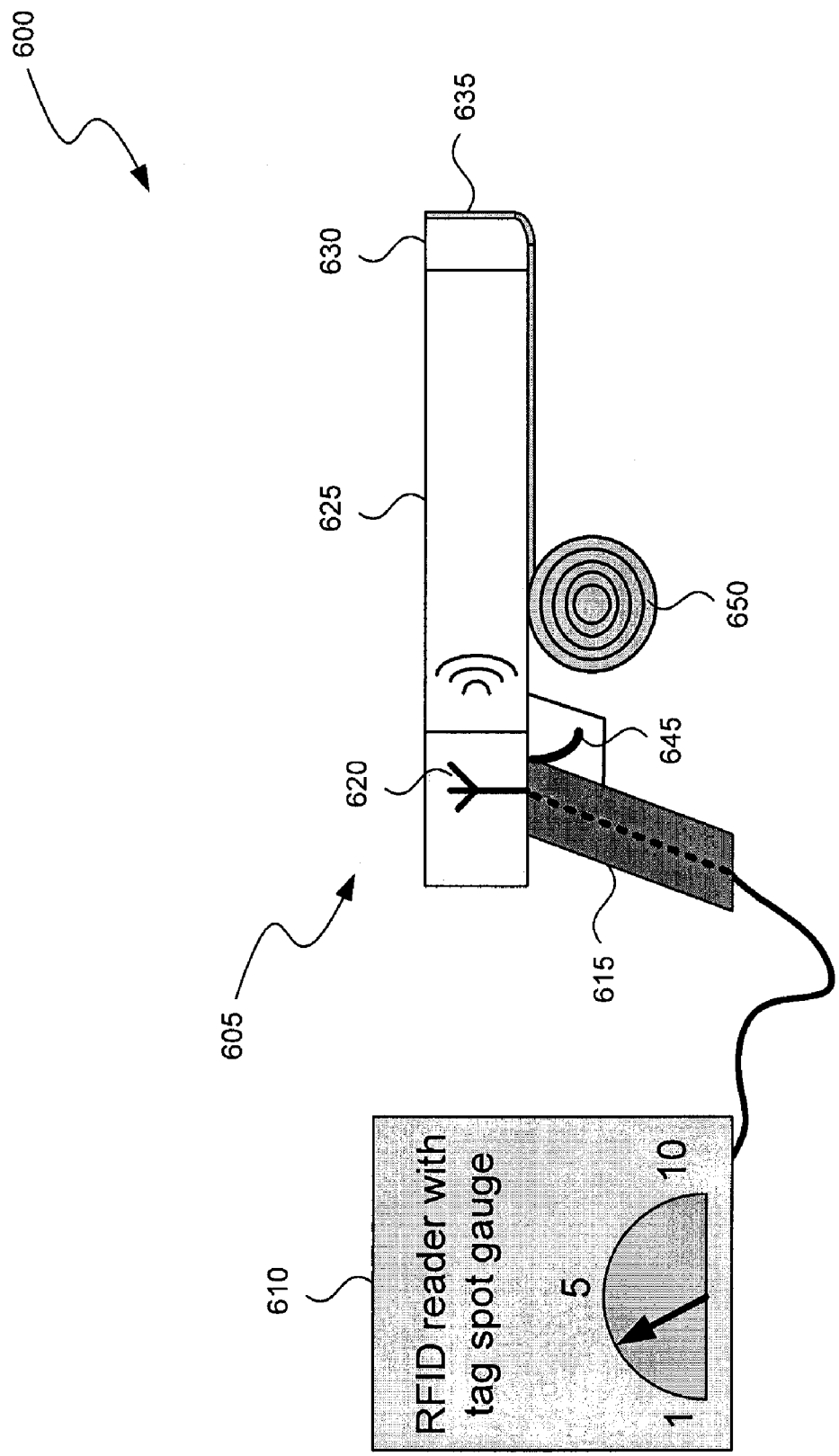
FIG. 6 illustrates an example apparatus for measuring minimum power values associated with different RFID locations.

FIG. 6 illustrates an example apparatus 600 for measuring minimum power values associated with different RFID locations of an object to be tagged. In general, apparatus 600 comprises a gun-shaped or hand-held device 605 for measuring the sensitivity of an RFID tag at different locations of the object, and a logic device 610 for displaying the sensitivity of the RFID tag at the different locations.

Device 605 comprises a grip handle 615, an antenna 620, a low-dielectric permittivity rod (or more generally, fixture) 625, a tag holder and applicator portion 630, a trigger 645, and a roll of RFID tags 650. The tag holder/applicator portion 630 and rod 625 hold a tag at a fixed and known distance from antenna 620. Antenna 620 transmits interrogation signals to a tag 635 attached to tag holder and applicator portion 630. When tag 635 is located close to objects generating significant electromagnetic interference, it is relatively less sensitive to the interrogation signals from antenna 620 and is therefore less likely to respond to the interrogation signals. On the other hand, when tag 635 is located away from objects generating significant electromagnetic interference, it is relatively more sensitive to the interrogation signals from antenna 620 and is therefore more likely to respond to the interrogation signals.

Upon receiving a response from tag 635, antenna 620 transmits response signals to display device 610. The response signals indicate that antenna 620 has received a response, and further indicate the lowest transmission power level used by antenna 620 to elicit the response. Display device 610 uses the transmission power level to calculate a sensitivity measure of tag 635 at a particular location in space. In the example of FIG. 5, the sensitivity measure is inversely proportional to the transmission power level transmitted to display device 610. In other words, lower values for the transmission power level generate higher values for the sensitivity measure and vice versa. This inverse proportionality can be expressed by the following equation (1):

$$S \propto \frac{1}{P_{min}}. \tag{1}$$

In equation (1), "S" represents the sensitivity of an RFID tag and "$P_{min}$" represents the minimum power required to elicit a response from the RFID tag.

Display device 610 may be implemented in a variety of different ways. For instance, display device 610 may be implemented in a digital logic platform such as a personal computer or a personal digital assistant (PDA). Alternatively, display device 610 may be implemented using one or more analog components. Display device 610 may output sensitivity measurements in a substantially continuous manner as a user moves device 605 to different locations of an object, or it may generate measurements at discrete moments or intervals, either with or without input from a user.

The roll of RFID tags 650 and trigger 645 are used for tagging objects once the desirability of different locations have been tested. To tag an object, a user places tag 635 against a surface of the object and presses trigger 645 to release tag 635. While the roll of RFID tags 650 and trigger 645 provide a convenient way to tag objects upon detecting desirable tag locations, device 605 can be implemented without these features so that tagging will take place in a different way.

Among the many benefits provided by device 605, one notable benefit is that it is portable and allows a user to measure RFID tag sensitivity in a variety of different environments. A feature that allows device 605 to operate in diverse environments is low dielectric permittivity rod 625. Low dielectric permittivity rod 625 provides an efficient and reliable transmission medium to enable communication between antenna 620 and tag 635. Additionally, low dielectric permittivity rod 625 is enclosed to prevent anything from blocking transmissions between antenna 620 and tag 635. In order for antenna 620 to effectively communicate with tag 635, antenna 620 should be separated from tag 635 by a distance at least as large as one wavelength of RF signals transmitted by antenna 620.

Figure 7:
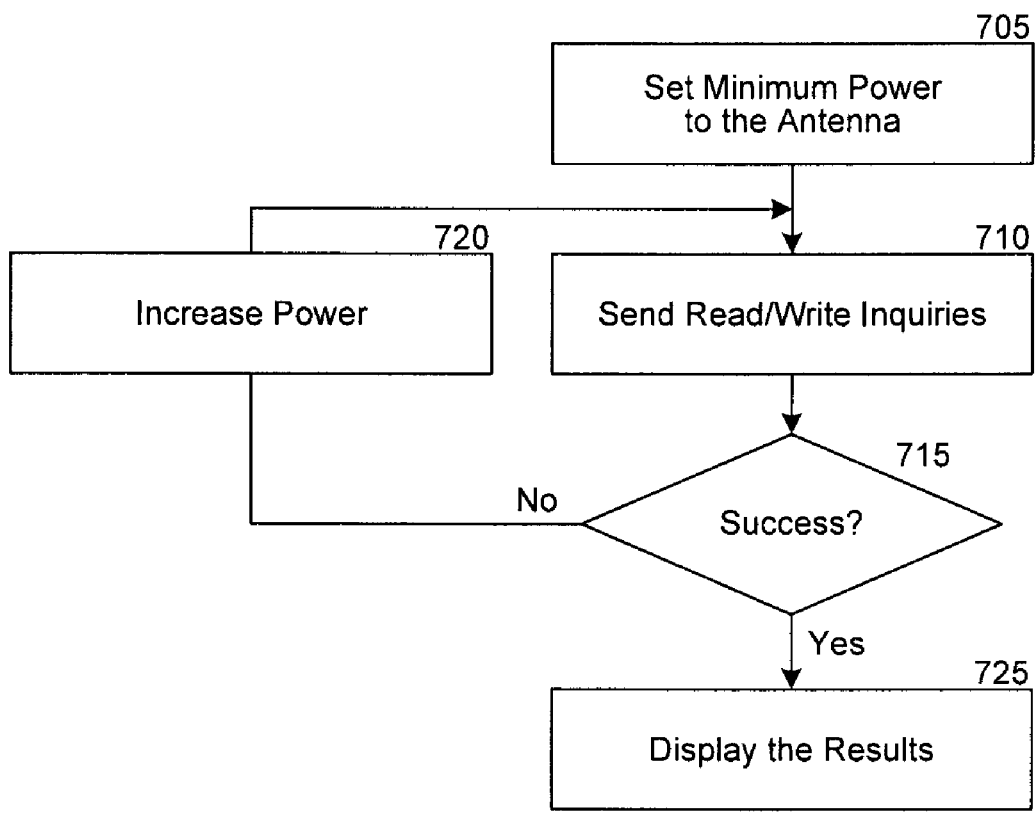
FIG. 7 is a flowchart illustrating an example method of measuring a minimum power value associated with an RFID tag location using an apparatus such as that illustrated in FIG. 6.

FIG. 7 is a flowchart illustrating an example method of measuring the respective minimum transmission power values associated with different RFID tag locations using an apparatus comprising an antenna connected to an RFID tag via a low dielectric permittivity rod. Although such an apparatus could take many different forms, the following explanation will assume that the method is performed by apparatus 600 shown in FIG. 6. Because the method of FIG. 7 is similar to the method of FIG. 3, the following description may omit certain details in order to avoid redundancy.

Briefly, the method of FIG. 7 begins by setting the transmission power level of antenna 620 to a predetermined minimum (705). Next, antenna 620 transmits interrogation signals such as read and/or write inquiries to tag 635 (710). Then, one or more logical components associated with antenna 620 determine whether tag 635 responds to the interrogation signals from antenna 620 (715). Upon determining that tag 635 has not responded to the interrogation signals from antenna 620 (715="NO"), the method increases the transmission power level (720) and repeats steps 710 and 715. On the other hand, upon determining that tag 635 responds to the interrogation signals from antenna 620 (715="YES"), device 605 outputs the current value of the transmission power level of antenna 620. This value is transmitted to display 610, where it is used to computes and display the sensitivity of tag 635.

Figure 8:
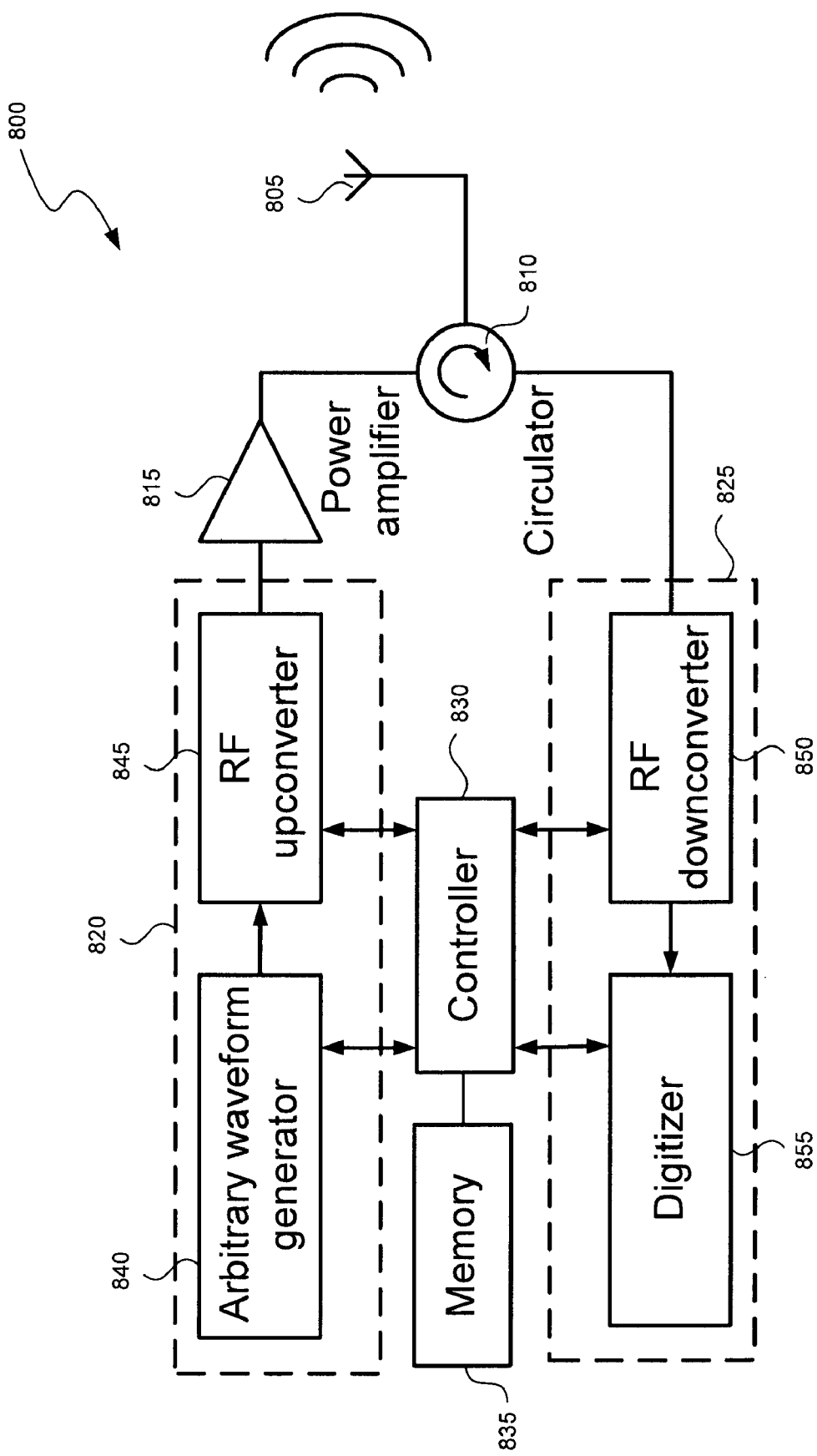
FIG. 8 illustrates an example RFID tag reader.

FIG. 8 is a block diagram illustrating selected components of an example RFID tag reader 800. Among other things, the components illustrated in FIG. 8 could be used in conjunction with any of the example systems illustrated in FIGS. 2, 5, and 6. For instance, the components of FIG. 8 could be used to communicate with any of the RFID tags illustrated in FIGS. 2, 5, and 6.

Referring to FIG. 8, RFID tag reader 800 comprises an antenna 805, a sending portion 820, a power amplifier 815, a receiving portion 825, a circulator 810, memory 835, and a controller 830. Controller 830 controls other components to perform steps for determining a minimum transmission power level required to communicate with one or more RFID tags. As an example, controller 830 could control the other components to perform the method of FIG. 3 or the method of FIG. 7.

Controller 830 comprises logical components such as software and hardware for controlling sending portion 820 and receiving portion 825 to send and receive signals through antenna 820. In some examples, a user accesses these logical components to configure or supervise controller 830 through a graphical user interface such as that illustrated in FIG. 9.

Controller 830 controls a waveform generator 840 in sending portion 820 to generate radio-frequency signals for a designated RFID tag. Controller 830 also controls an RF upconverter 845 in sending portion 820 to upconvert the radio-frequency signals and output the upconverted signals to power amplifier 815. Power amplifier 815 amplifies the upconverted signals and transmits the amplified signals to antenna 805 through circulator 810. Antenna 805 transmits the amplified signals to the RFID tag. These amplified signals may act as interrogation signals to elicit a response from the designated RFID tag.

Controller 830 controls an RF downconverter 850 in receiving portion 825 to downconvert signals received from antenna 805 through circulator 810. The signals received from antenna 805 may comprise response signals from a designated RFID tag. A digitizer 855 receives and digitizes the downconverted signals generated by RF downconverter 850. Digitizer 855 then transmits the digitized signals to controller 830, which may use the digitized signals to generate a sensitivity measurement for the designated RFID tag.

As in the methods of FIGS. 3 and 7, if controller 830 controls sending portion 820 to send interrogation signals to a designated RFID tag, but does not receive any response signals from the tag, controller 830 may increase the power level used to transmit the interrogation signals. The increased power level can be achieved in a variety of ways. As one example, controller 830 could control waveform generator to increase the amplitude of generated waveforms. As another example, controller 830 could control power amplifier 815 to increase its gain. Upon receiving a response from the designated RFID tag, controller 830 may use the power level of the most recent interrogation signals to calculate a measure of the sensitivity of the designated RFID tag.

Figure 9:
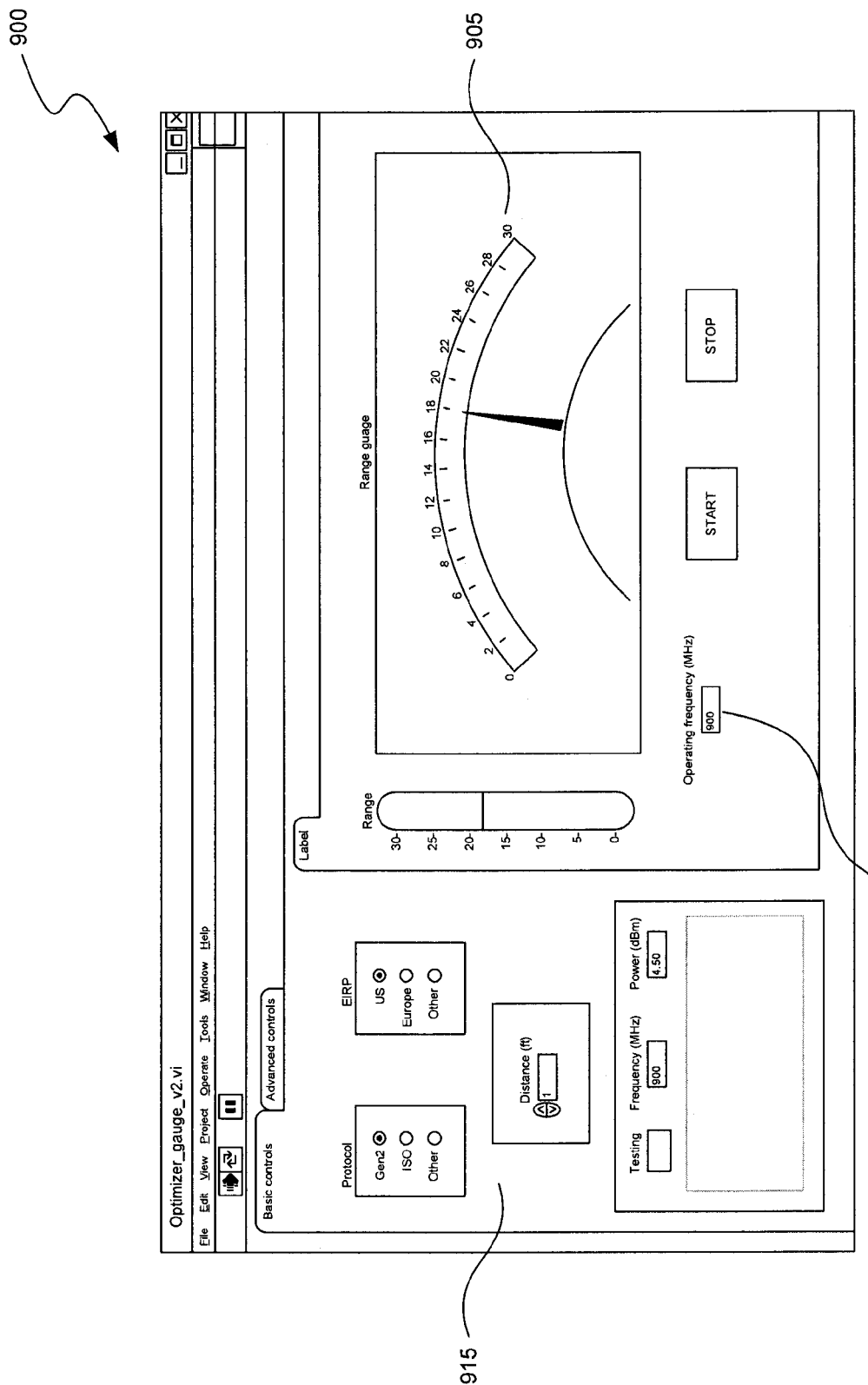
FIG. 9 illustrates a computer interface for interacting with a system for determining RFID tag placement.

FIG. 9 illustrates an example interface 900 allowing a user to control a system for determining RFID tag placement, and providing a display of RFID tag sensitivity. Interface 900 comprises a display section 905 showing measurements of RFID tag sensitivity. The sensitivity measurements shown in FIG. 9 are measured as a maximum range over which an RFID tag reader can communicate with a selected RFID tag. In this example, the maximum range is derived from the measured minimum transmission power level of the RFID tag reader for which the selected RFID tag responds to interrogation signals. More particularly, in the example of FIG. 9, the maximum range is calculated by the following equation (2):

$$r_{max} = d\sqrt{\frac{EIRP}{P_{min}G_a}} \qquad (2)$$

Where "$r_{max}$" represents the range over which an RFID tag reader can communicate with the RFID tag, "d" is the distance between the RFID tag reader's antenna (e.g., 1 meter, or within a range of 0.5-3.0 m), "$G_a$" represents the gain of the RFID tag reader's antenna (e.g., 6 dBi, or within a range of 2 dBi-6 dBi), "$P_{min}$" represents a minimum power level required to elicit a response from the RFID tag, and EIRP represents a particular setting of equivalent isotropically radiated power (EIRP). According to equation (2), after the minimum power level $P_{min}$ has been measured, the range $r_{max}$ for a particular RFID tag and RFID tag reader varies in proportion to EIRP.

Interface 900 further comprises a field 910 for setting an operating frequency of the system being controlled through the interface. In other words, field 910 is used to control the frequency setting at which an RFID tag reader transmits and receives signals. Accordingly, in systems using a tag reader such as that illustrated in FIG. 8, field 910 can be used to control the rate of transmission and reception at upconverters and downconverters. In general, the example systems and methods presented in this disclosure may be designed to operate under any available frequency band. Accordingly, field 910 could set the operating frequency of the system to any of several different operating frequencies, such as 433 MHz, 915 MHz, 2.45 GHz, etc.

Interface 900 further comprises a section 915 including radio buttons for allowing a user to select different RFID transmission protocols and different equivalent isotropically radiated power (EIRP) settings. The example systems and methods in this disclosure may be implemented to operate with any available RFID transmission protocol, such as ISO, Class 0, Class 1, Gen 2, etc. Accordingly, the radio buttons in section 915 allow a user to specify one among these or other protocols. Additionally, the example systems and methods may be implemented to operate with any available EIRP setting. Accordingly, the radio buttons in section 915 allow a user to specify a desired EIRP setting.

The example interface 900 shown in FIG. 9 could be modified in a variety of ways based on a user's specific testing needs. For instance, the display section 905 could be modified to show measurement values for multiple RFID tags in a sheet such as that illustrated in FIG. 2. Additionally, interface 900 could be modified to allow a user to modify additional parameters such as the success criterion for determining reliable communication, the transmission power increment used in the method of FIGS. 3 and 7, and so on.

The example systems and methods presented in this disclosure provide efficient and cost effective ways to determine desirable locations for RFID tags on objects such as packages, crates, products, inventory, and so on. These systems and methods tend to be user-friendly and relatively inexpensive to implement. In some examples, these systems and methods are combined with automatic tag applicators to place RFID tags in the locations determined to be desirable.

Some of the presented systems and methods are fast enough to detect desirable RFID tag locations on moving objects such as boxes on a conveyor belt. Additionally, some of the presented systems are capable of performing measurements in unusual environments or spaces.

While the above systems and methods use an RFID tag reader's transmission power level to evaluate RFID tag locations, other alternative values or measurements could used. Examples of alternative values or measurements include a bit error rate of transmissions between RFID tags, received signal strength indication (RSSI), etc.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the invention provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the inventors reserve the right to add additional claims after filing the application to pursue such additional claim forms for other aspects of the invention.

The invention claimed is:

1. A system for determining where to place a radio frequency identification (RFID) tag on each of multiple boxes whose contents may affect response characteristics of the RFID tag, the system comprising:
   an RFID tag reader comprising:
      a reader antenna located at a fixed distance from at least one RFID tag, wherein the fixed distance is larger than one wavelength of an interrogation signal generated by the reader antenna to interrogate the at least one RFID tag; and
      a variable power signal source for generating the interrogation signal at differing power levels; and
   a power reader receiving an indication of a minimum power level of the interrogation signal for which the at least one RFID tag responds to the interrogation signal when the at least one RFID tag is placed at in a particular location relative to one of the multiple boxes,
   wherein the RFID tag reader is located adjacent to a conveyor belt;
   wherein the at least one RFID tag comprises a sheet of multiple RFID tags attached to, or at least temporarily held on to, a test box on the conveyor belt; and
   wherein the system determines where to place an RFID tag on each of the multiple boxes by detecting a most sensitive RFID tag among the multiple RFID tags attached to the test box and determining to place the RFID tag on the multiple boxes at a location corresponding to the location of the most sensitive RFID tag on the test box.

2. The system of claim 1, wherein the reader antenna is mounted at one end of a low-dielectric permittivity fixture and a test RFID tag is mounted at another end of the low-dielectric permittivity fixture and far from the reader antenna, wherein the low-dielectric permittivity fixture provides a substantially unobstructed communication path between the reader antenna and the test RFID tag.

3. The system of claim 1, wherein detecting the most sensitive RFID tag comprises testing each of the multiple RFID tags to determine the minimum power level of interrogation signals for which the RFID tag reader detects a response from each of the RFID tags, and identifying the RFID tag having the lowest minimum power level as the most sensitive RFID tag or as a preferred box location for receiving an RFID tag.

4. The system of claim 1, further comprising:
   an automatic RFID tag applicator attached to the RFID tag reader.

5. The system of claim 1, further comprising an RFID tag applicator attached to the RFID tag reader, wherein the RFID tag applicator comprises a trigger mechanism for applying an RFID tag to an object in response to pressure applied to the trigger.

6. A method of interacting with a radio frequency identification (RFID) tag, the method comprising:
   (a) establishing a first power setting for transmissions of an RFID tag reader antenna;
   (b) by operation of the RFID tag reader antenna, transmitting an interrogation signal to the RFID tag;
   (c) determining whether the RFID tag recognizes the transmitted interrogation signal;
   (d) based on a certain outcome of the determination, adjusting the power setting for transmissions of the RFID tag reader antenna and repeating (b), (c), and (d) with the adjusted power setting; and
   (e) upon determining that the RFID tag recognizes the transmitted interrogation signal, storing the power setting of the RFID tag reader antenna at the time of the recognition;
   performing (a)-(e) for each of multiple RFID tags attached to a test box whose contents may affect the response characteristics of the multiple RFID tags;
   detecting a lowest power setting among the power settings stored for each of the multiple RFID tags; and
   placing an RFID tag on an object at a location determined by the location of the RFID tag with the lowest power setting on the test box.

7. The method of claim 6, wherein the certain outcome occurs when an indication is received that the RFID tag does not recognize the transmitted interrogation signal.

8. The method of claim 6, further comprising:
   displaying an indication of the relative sensitivity of the RFID tag, wherein the indication is derived from the stored power setting.

9. The method of claim 6, wherein determining whether the RFID tag recognizes the transmitted interrogation signal comprises:
   awaiting a response from the RFID tag;
   upon failing to receive a response from the RFID tag within a predetermined time period, determining that the RFID tag does not recognize the transmitted interrogation signal; and
   upon receiving a response from the RFID tag within the predetermined time period, determining that the RFID tag recognizes the transmitted interrogation signal.

10. A method of determining radio frequency identification (RFID) tag placement, the method comprising:
   transmitting interrogation signals with different power levels from an RFID tag reader to multiple RFID tags arranged in fixed locations relative to each other;
   determining the sensitivity of each of the RFID tags to the transmitted interrogation signals based on the power levels at which the tags respond to the interrogation signals; and based on the sensitivity determination, identifying one of the fixed locations as a location for placing RFID tags on objects to be associated with RFID tags.

11. The method of claim 10, wherein determining the sensitivity of each of the RFID tags to the transmitted interrogation signals comprises:
for each RFID tag, transmitting one or more interrogation signals from the RFID tag reader to the RFID tag with power levels that increase with successive transmissions, until the RFID tag reader detects a response to one of the transmissions, and recording the power level of an interrogation signal that elicited the response as a measure for the RFID tag's sensitivity.

12. The method of claim 10, wherein the multiple RFID tags are arranged on a test sheet, and the sensitivity of the tags is measured while the test sheet is separated from potential sources of electromagnetic interference.

13. The method of claim 10, further comprising:
marking an object at a location corresponding to the identified one of the fixed locations.

14. An apparatus for evaluating the placement of one or more radio frequency identification (RFID) tags on a target object, the apparatus comprising:
an RFID tag reader antenna;
a tag holder adapted to hold the one or more RFID tags; and
a positioning apparatus connected between the RFID tag reader antenna and the tag holder and adapted to maintain the tag holder and the RFID tag reader antenna in a fixed orientation relative to each other during an evaluation of the placement of the one or more RFID tags,
wherein the evaluation of the placement of the one or more RFID tags comprises:
placing the one or more RFID tags adjacent to the target object; and
with the one or more RFID tags adjacent to the target object, determining one or more minimum power settings for transmissions of the RFID tag reader antenna for which the one or more RFID tags respond to the transmissions.

15. The apparatus of claim 14, further comprising:
an RFID tag applicator coupled to the positioning apparatus and adapted to place an RFID tag on the target object.

16. The apparatus of claim 14, further comprising:
a logical component coupled to the RFID antenna and adapted to detect a minimum power level of the RFID antenna for which the RFID tag responds to transmissions from the RFID antenna when the RFID tag is positioned at a particular orientation.

17. The apparatus of claim 16, further comprising a display device coupled to the logical component and adapted to display an indication of the sensitivity of the RFID tag at the particular orientation based on the detected minimum power level.

18. A system for determining radio frequency identification (RFID) tag placement, the system comprising:
means for transmitting interrogation signals with different power levels from an RFID tag reader to multiple RFID tags arranged in fixed locations relative to each other;
means for determining the sensitivity of each of the RFID tags to the transmitted interrogation signals based on the power levels at which the tags respond to the interrogation signals; and
based on the sensitivity determination, means for identifying one of the fixed locations as a location for placing RFID tags on objects to be associated with RFID tags.

19. The system of claim 18, wherein means for determining the sensitivity of each of the RFID tags to the transmitted interrogation signals comprises:
for each RFID tag, means for transmitting one or more interrogation signals from the RFID tag reader to the RFID tag with power levels that increase with successive transmissions, until the RFID tag reader detects a response to one of the transmissions, and means for recording the power level of an interrogation signal that elicited the response as a measure for the RFID tag's sensitivity.

20. The system of claim 18, wherein the multiple RFID tags are arranged on a test sheet, and the sensitivity of the tags is measured while the test sheet is separated from potential sources of electromagnetic interference.

21. The system of claim 18, further comprising:
means for marking an object at a location corresponding to the identified one of the fixed locations.

22. A system for interacting with a radio frequency identification (RFID) tag, the system comprising:
(a) means for establishing a first power setting for transmissions of an RFID tag reader antenna;
(b) by operation of the RFID tag reader antenna, means for transmitting an interrogation signal to the RFID tag;
(c) means for determining whether the RFID tag recognizes the transmitted interrogation signal;
(d) based on a certain outcome of the determination, means for adjusting the power setting for transmissions of the RFID tag reader antenna and repeating (b), (c), and (d) with the adjusted power setting;
(e) means for storing the power setting of the RFID tag reader antenna at the time of the recognition by the RFID tag of the transmitted interrogation signal, wherein each of (a)-(e) operate upon each of multiple RFID tags attached to a test box whose contents may affect the response characteristics of the multiple RFID tags; and
means for detecting a lowest power setting among the power settings stored for each of the multiple RFID tags; and
means for placing an RFID tag on an object at a location determined by the location of the RFID tag with the lowest power setting on the test box.

23. The system of claim 22, wherein the certain outcome occurs when an indication is received that the RFID tag does not recognize the transmitted interrogation signal.

24. The system of claim 22, further comprising:
means for displaying an indication of the relative sensitivity of the RFID tag, wherein the indication is derived from the stored power setting.

25. The system of claim 22, wherein means for determining whether the RFID tag recognizes the transmitted interrogation signal comprises:
means for awaiting a response from the RFID tag;
means for determining that the RFID tag does not recognize the transmitted interrogation signal upon failing to receive a response from the RFID tag within a predetermined time period; and
means for determining that the RFID tag recognizes the transmitted interrogation signal upon receiving a response from the RFID tag within the predetermined time period.

* * * * *

UNITED STATES PATENT AND TRADEMARK OFFICE
CERTIFICATE OF CORRECTION

| | | |
|---|---|---|
| PATENT NO. | : 8,339,266 B2 | Page 1 of 1 |
| APPLICATION NO. | : 12/046377 | |
| DATED | : December 25, 2012 | |
| INVENTOR(S) | : Pavel Nikitin et al. | |

It is certified that error appears in the above-identified patent and that said Letters Patent is hereby corrected as shown below:

In the Specification

In column 6, line 56, Delete "power" and insert -- power. --, therefor.

Signed and Sealed this
Seventeenth Day of September, 2013

Teresa Stanek Rea
*Deputy Director of the United States Patent and Trademark Office*